Figure 1:
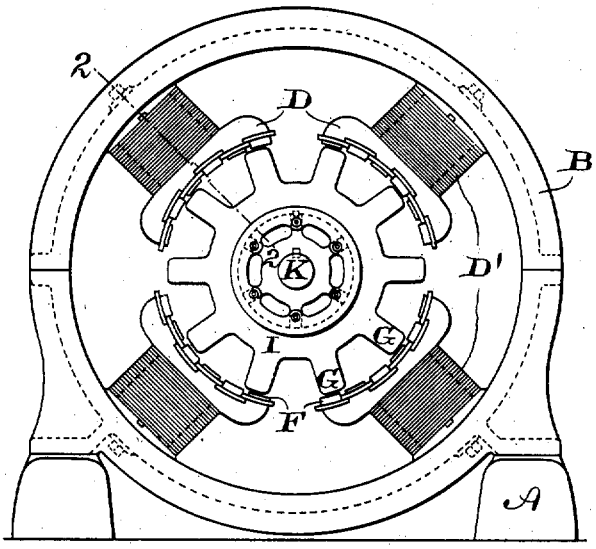

2 Sheets—Sheet 1.

C. P. STEINMETZ.

INDUCTOR DYNAMO.

No. 11,576. Reissued Nov. 24, 1896.

WITNESSES.
A. H. Abell.
A. H. Macdonald.

INVENTOR.
Charles P. Steinmetz,
by
Geo. R. Blodgett,
atty.

C. P. STEINMETZ.

INDUCTOR DYNAMO.

No. 11,576. Reissued Nov. 24, 1896.

WITNESSES.

A. H. Abell.

A. Macdonald.

INVENTOR.

Charles P. Steinmetz, by

Geo. R. Blodgett, Atty.

UNITED STATES PATENT OFFICE.

CHARLES P. STEINMETZ, OF SCHENECTADY, NEW YORK, ASSIGNOR TO THE GENERAL ELECTRIC COMPANY, OF NEW YORK.

INDUCTOR-DYNAMO.

SPECIFICATION forming part of Reissued Letters Patent No. 11,576, dated November 24, 1896.

Original No. 559,419, dated May 5, 1896. Application for reissue filed October 31, 1896. Serial No. 610,753.

*To all whom it may concern:*

Be it known that I, CHARLES P. STEINMETZ, a citizen of the United States, residing at Schenectady, in the county of Schenectady, State of New York, have invented certain new and useful Improvements in Inductor-Dynamos, (Case No. 479,) of which the following is a specification.

My invention relates to dynamo-electric machines, especially those of the inductor type, now well known in the art; and it consists in the general type of machine by which I obtain a novel and useful apparatus, as well as, in a more specific sense, improved details of construction which I have devised, by which the first cost of the machine may be largely reduced, in that I am enabled to use a less number of field-coils and field-magnet cores, and also to some extent to employ standard forms of apparatus made from patterns suitable for dynamos of other constructions. To this end I employ for my improved dynamo a field-magnet of ordinary type—that is, having inwardly-extending laminated pole-pieces provided with ordinary windings. The pole-pieces, however, I somewhat extend circumferentially, and upon these extended pole-faces I mount the armature-coils of the machine. Adjacent to these coils, which may of course be connected in any suitable relation to obtain current of one or more phases, the inductor revolves. In most inductor-dynamos the inductor consists of a bobbin-like structure, in section somewhat like the letter H, composed of two star-wheels connected at their centers by a central body or shaft, about which a coil may be wound to determine the polarity of the mass. Each of these star-wheels is of different polarity—that is to say, all the projections on one are of north polarity and all on the other of south polarity, each one being provided with its own stationary armature, the two armatures being mounted side by side in a common frame.

My improved inductor differs from those just described in that the inductor, although a single unitary structure, is when stationary of north polarity on one side of its diameter and of south polarity on the other side, the plane of division passing through its axis of revolution, or substantially so. Thus the inductor projections, which in ordinary constructions preserve the same polarity during the entire revolution, in my improved arrangement reverse their polarity as they pass from one field to another. I have described the construction as applicable to a bipolar structure, but it may be used with even better effect in multipolar apparatus, and in this particular form I have illustrated it. Of course in this case the inductor would be composed of sectors of different polarity, equal in number to the pole-pieces.

Figure 2:
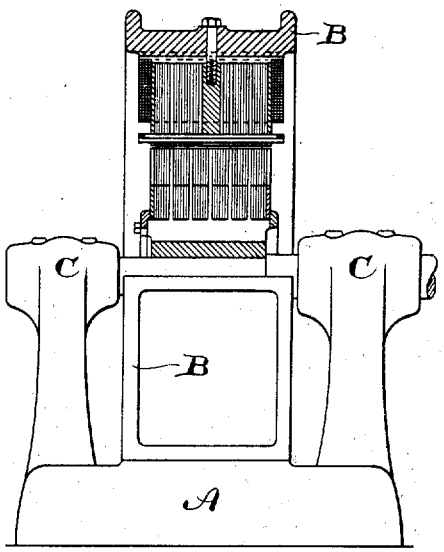
Figure 3:
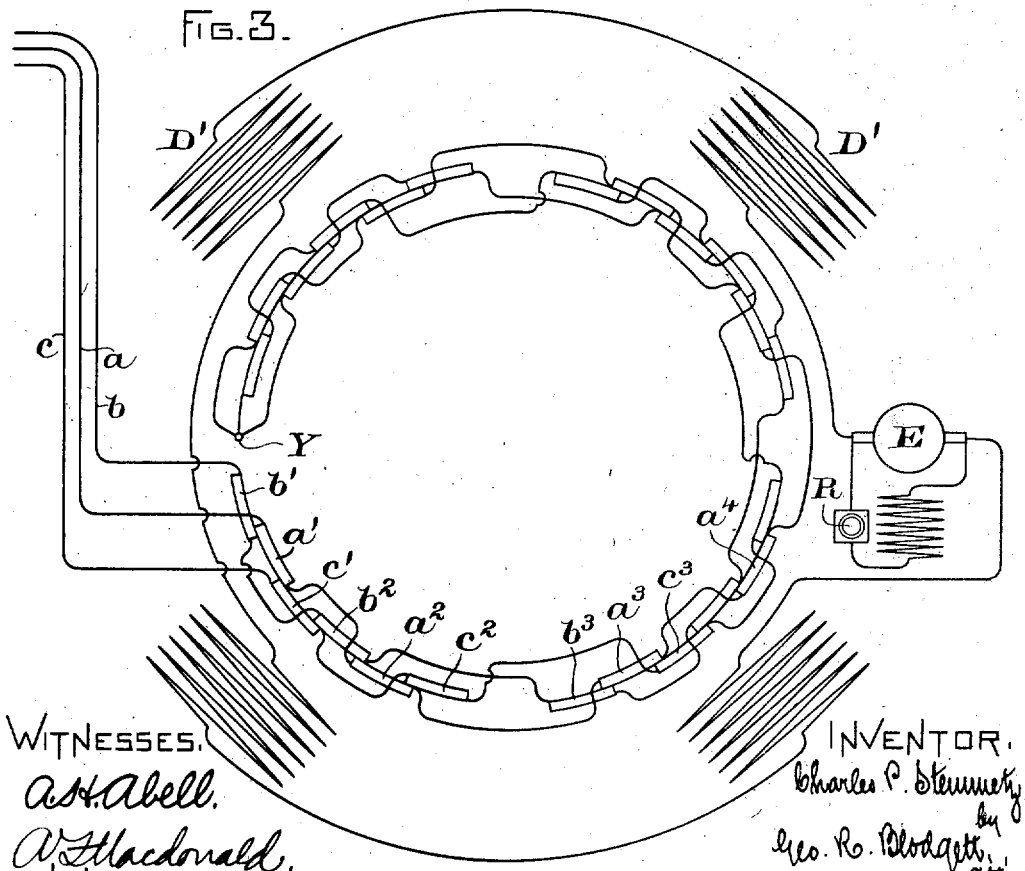
Figure 4:
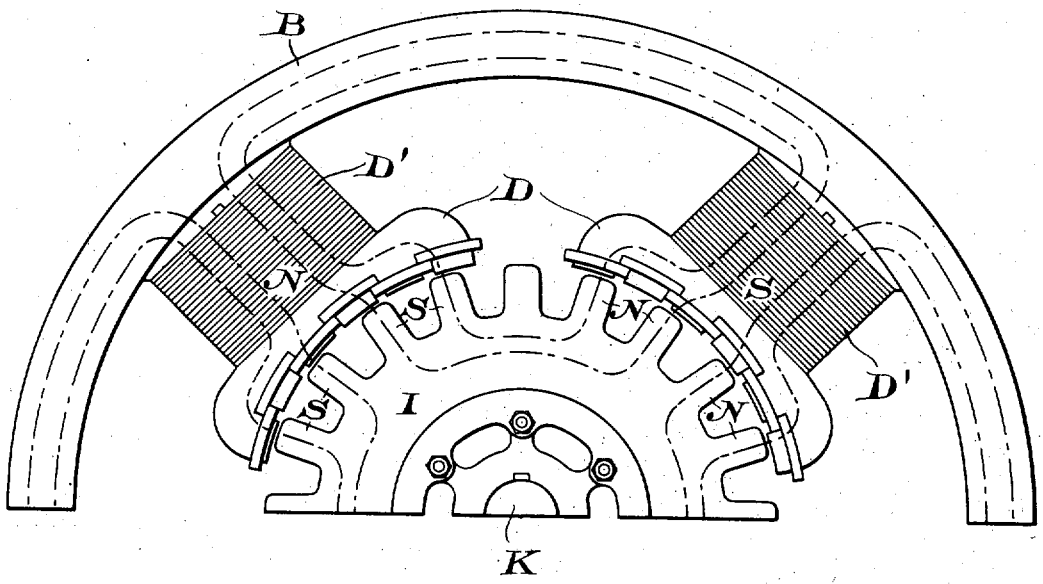
Figure 5:
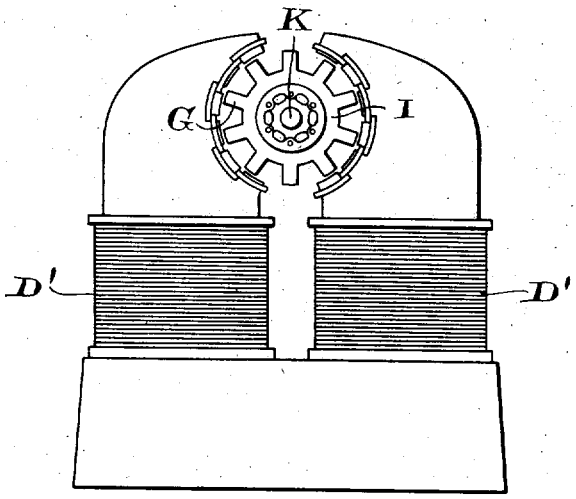

The accompanying drawings show my invention, Figure 1 being a side elevation of my improved machine with one of the bearings removed; Fig. 2, an end elevation, partly in section, upon the line 2 2 of Fig. 1. Fig. 3 is a diagram of the electric circuits. Fig. 4 is a sketch illustrating the magnetic paths of the machine, and Fig. 5 is a modified form.

A is the base of the machine. B is the field-magnet frame. C C are the bearings for the armature. Pole-pieces D D in the case illustrated for a four-pole machine are also provided with suitable field-magnet coils D′ D′, surrounding the pole-pieces. The polar faces F F are extended circumferentially partly around the revolving inductor.

K is the shaft of the machine, to which is keyed a suitable spider carrying the inductor I.

G G are the projecting arms of the inductor, by the motion of which past the armature-coils a difference of magnetic condition is produced. Upon the extended pole-faces F F the armature-coils $a'$ $b'$ $c'$ are disposed. In the case illustrated I have shown a three-phase machine, and there are six coils disposed upon each polar face.

The circuits are best seen in Fig. 3, in which $a$ $b$ $c$ are the leads from the armature-coils, and $a'$ $b'$ $c'$ are the armature-coils themselves. The order of connection is best seen by tracing the connection of a series of coils—for instance, that lettered $a$. The coil $a'$, being most nearly adjacent to the inductor, is connected to the coil $a^2$, which is on the under layer, while $a^3$ is upon the upper layer. $a^4$ again is on the under layer, and so on around the armature. These connected coils give rise to the current of one phase, while the next set $b'$ $b^2$ $b^3$ provides the current of another phase, and $c'$ $c^2$ $c^3$, &c., the current of the third phase. All of the coils are connected together at the point Y, although nothing in my invention excludes the use of the delta-winding. The field-magnets form a circuit closed through the exciter E of the usual shunt type, provided with a regulating-resistance R for determining the output of the machine. I prefer to have the polar faces provided with projections upon which the coils may be mounted, the effect of these projections being similar to those on any revolving armature of the toothed type. By mounting the coils in sets upon these polar-face projections, the coils being alternately adjacent to and slightly removed from the inductor—as, for instance, the coils $a'$ $a^2$ $a^3$—the total inductance of each of the circuits is substantially equalized.

In Fig. 4 I show the magnetic paths of the machine. In this case it will be observed that each of the projections or teeth of the inductor is of polarity opposite to that of the polar face adjacent to which it may be. For instance, suppose four of the inductor-teeth be opposite each of the poles. There would then be four fluxes across the air-gap and through the armature-coils, as shown. As the inductor moves each of these different fluxes would shift along the polar face of the field-magnet and thus would cut each of the coils in succession.

In Fig. 5 I illustrate the application of my invention to the bipolar construction, which, for small machines or high speeds, might be conveniently done, although I prefer a multipolar structure.

All of the forms illustrated have the common advantage of providing a single field-magnet winding which will produce a number of separate magnetic fields. For instance, suppose the machine to have sixty-four poles. It might still be made in the form illustrated in Fig. 1, and sixteen coils (in a single-phase machine) would be disposed upon each polar face, and an inductor having a suitable number of teeth being provided to pass the magnetic flux through the different coils in the order desired. The economy in copper cost is thus manifest, as a single coil, necessarily larger than any one of the field-magnet coils, but very much smaller than the sum of sixteen of such coils, would be sufficient to provide the field-excitation.

The machine is not only advantageous in regard to copper cost, but, owing to the smaller resistance of the field-magnet windings, a less amount of current will be consumed in excitation and the efficiency thus increased.

I aim to include in the scope of the claims appended variations of form and other changes of construction not involving departure from the principles of construction herein set out.

What I claim as new, and desire to secure by Letters Patent of the United States, is—

1. An inductor-dynamo having inwardly-projecting pole-pieces provided with field-magnet windings, armature-coils mounted upon the polar faces, and a revolving inductor.

2. An inductor-dynamo comprising a field-magnet having projecting pole-pieces, pole-faces circumferentially extended, the armature-coils being mounted upon the polar faces, and a revolving inductor.

3. An inductor-dynamo having inwardly-extending pole-pieces, polar faces provided with projections, and armature-coils mounted upon the projections of the polar faces.

4. An inductor-dynamo comprising inwardly-extending pole-pieces, polar faces provided with projections, and armature-coils mounted in sets upon the projections of the polar faces, alternate coils in each set being adjacent to and removed from a revolving inductor.

5. An inductor-dynamo comprising a field-magnet having inwardly-extending pole-pieces of alternately-opposite polarity, armature-coils mounted upon the polar faces of the field-magnets, and a revolving inductor having projections passing through the fields created by the field-magnet poles.

6. A field-magnet structure for an inductor-dynamo, comprising field-magnet cores, polar faces having projections upon which the coils may be wound, and a coil upon each field-magnet core, the coil magnetizing all of the projections.

In witness whereof I have hereunto set my hand this 14th day of October, 1896.

CHARLES P. STEINMETZ.

Witnesses:

B. B. HULL,

J. LE D. LANGDON.